US005262895A

United States Patent [19]

LaDuke et al.

[11] Patent Number: 5,262,895

[45] Date of Patent: Nov. 16, 1993

[54] OPTICAL COLOR SYNTHESIZER

[76] Inventors: Thomas F. LaDuke, 10304 Carlotta Ave., Buena Park, Calif. 90620; Joel D. Gruber, 24151 Paseo Del Campo, Laguna Niguel, Calif. 92677

[21] Appl. No.: 794,050

[22] Filed: Nov. 19, 1991

[51] Int. Cl.[5] .......................... G02B 27/14; G02B 5/22

[52] U.S. Cl. .................................... 359/634; 359/890; 359/236; 359/888

[58] Field of Search ............... 359/634, 890, 236, 230, 359/888

[56] References Cited

U.S. PATENT DOCUMENTS

| | | | |
|---|---|---|---|
| 3,049,962 | 8/1962 | Denecke | 359/236 |
| 3,121,798 | 2/1964 | Ploke | 359/236 |
| 3,384,147 | 5/1968 | Smith | 359/236 |
| 4,880,294 | 11/1989 | Brakenhoft | 359/230 |
| 5,044,730 | 9/1991 | LaDuke et al. | 359/634 |

FOREIGN PATENT DOCUMENTS

| | | | |
|---|---|---|---|
| 14417 | 2/1977 | Japan | 359/634 |
| 151609 | 8/1985 | Japan | 359/236 |

*Primary Examiner*—Jon W. Henry
*Attorney, Agent, or Firm*—Harness, Dickey & Pierce

[57] ABSTRACT

A color synthesizing device for generating a plurality of hues of color from visible light employing a beam splitter system to split the light into the three primary colors, mechanical attenuators to independently attenuate the primary color and light beams, and a recombination system to recombine the light beams to obtain the desired color hue of light.

24 Claims, 1 Drawing Sheet

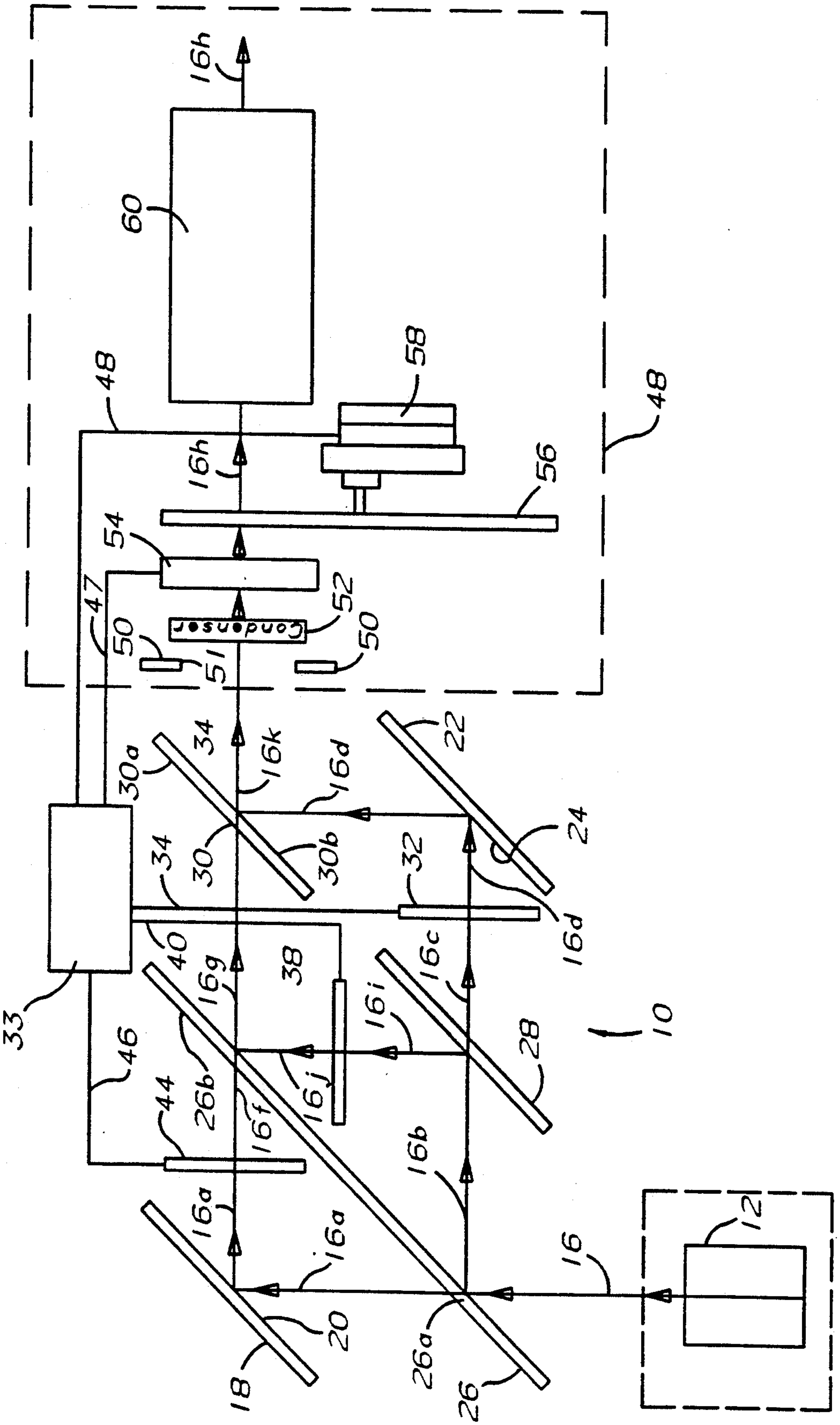
16h
60
48
58
48
16h
56
54
47
52
50
Condenser
51
50
34
16k
16d
22
30a
30
30b
24
34
32
16d
33
40
16g
38
16c
16i
28
10
46
26b
16j
44
16f
16b
16a
16a
12
16
20
18
26a
26

OPTICAL COLOR SYNTHESIZER

BACKGROUND OF THE INVENTION

Field of the Invention

The present invention relates to an optical color synthesizer for generating color hues, more particularly to an apparatus for generating various hues of color in the visible spectrum.

Description of the Related Art

Presently, there exist devices for changing the color or generating various color hues of light. A non-mechanical solid state color changing device is covered by the LaDuke, Gruber and Romano U.S Pat. No. 5,044,730. The color changing device of this patent is an excellent device, but the optical efficiency is less than 65% In many instances a more efficient optical device would be beneficial, that is, a device that has less than 35% light loss would be desirable in many instances.

More conventional devices for generating a color hue include rotating dichroics operated by servo motors. The dichroics are placed vertically in the optical path of the light and rotated by the servo motors to obtain the color desired. The dichroics can change their transmission spectrum with use. These problems result in an expensive color changing device.

It is one object of the present invention to provide an opto-mechanical color synthesizer. It is another object of the present invention to provide non-movable dichroics for color separation. It is a further object of the present invention to provide a relatively simple opto-mechanical device. It is a still further advantage of the present invention to provide an inexpensive optical color synthesizer. Still another object is to provide a color synthesizer that is at least 65% optically efficient, that is, a device that keeps light losses to 35% or less. The present device can achieve optical efficiencies up to 80% or better.

SUMMARY OF THE INVENTION

Accordingly, the present invention is a device for generating a plurality of colors of light from a light source. The device includes a plurality of filters to separate the light into the primary colors, red, green and blue, at predetermined wave lengths and to recombine them at different amplitudes to generate a predetermined color hue in the visible spectrum of light.

One advantage of the present invention is that the device is a relatively simple opto-mechanical device. Another advantage of the present invention is that the parts for the device are available off the shelf. A further advantage of the present invention is that the focal lengths of the light paths are the same or equidistant so that the light is in phase when recombined. Another advantage of the present invention is that a single optical path and light source are used for attenuating the dichroics.

Other advantages of the present invention will be readily appreciated as the same become better understood by reference to the following detailed description when considered in connection with the accompanying drawing.

BRIEF DESCRIPTION OF THE DRAWINGS

FIG. 1 is a schematic view of the color changing device according to the present invention.

DESCRIPTION OF THE PREFERRED EMBODIMENT OF THE INVENTION

Referring to FIG. 1, an optical color synthesizer 10 according to the present invention is shown. The device 10 receives light from a light source 12 which generates a light beam. A typical light source 12 could be a 1000 watt xenon light source, a 360 watt halogen light source, a 500 watt metal halide lamp source, a 75 watt incandescent light, a 250 watt HMI light source, and the like. The power of the light source is not critical to operation of the color synthesizer 10.

The light source is preferably visible light covering the visible spectrum from about 400 to about 800 nanometers ("nm" herein). Light having a wave length range extending into the uv range can be used. Light having a wave length longer than about 800 nm can be used, but preferably the light longer than about 800 nm is filtered out with an infra-red absorption filter which transmits light with a wave length of less than about 800 nm or a cold mirror which transmits 90% or more of the light at 45° incidence with a wave length of about 800 nm or greater and reflects light at 45° incidence with a wave length of about 800 nm or less. Infra-red light having a wave length of about 800 nm or more can place a heat load on the filters and mirrors of the optical color synthesizer.

The device 10 includes a first mirror 18 in the optical path 16 of the light source 12. The first mirror 18 has a reflecting surface 20 coated with aluminum having a wavefront deformation of g/10 or better. The aluminum can be coated with silicon dioxide to improve performance. This produces better than ninety-five (95) percent reflection of light with a wave length from six hundred (600) to eight hundred (800) nanometers. But depending upon the end use, other types of first surface mirrors can be employed. The first mirror 18 is placed in the optical path of the light beam from the light source at a forty-five (45) degree angle of incidence. A second mirror 22 having a reflecting surface 24 is disposed between the light source and the first mirror and spaced axially therefrom. The second mirror 22 is similar to the first mirror 18 and is placed in the optical path at a forty-five (45) degree angle of incidence to the light beam **16*d*** directed at it. The second mirror efficiently reflects light having a wave length of between about 500 and about 600 nm.

The device 10 also includes a first filter 26. A first portion of the filter is spaced between the light source 12 and the first mirror 18. A second portion of the first filter is located between the first mirror 18 and a filter 30 described below. The first portion of the first filter 26 is placed in the optical path of the light beam 16 from the light source 12 at a forty-five (45) degree angle of incidence. The first filter 26 is a red transmission/cyan reflecting filter or a forty-five (45) degree separation filter. The first filter 26 transmits greater than ninety-five (95) percent of the red light with a wave length between about six hundred (600) and about eight hundred (800) nanometers via optical path **16*a*, and reflects ninety (90) percent of the cyan (blue and green) light between about four hundred (400) and about six hundred (600) nanometers via optical path 16*b***.

The device 10 further includes a second filter 28 spaced axially between the first filter 26 and second mirror 22. The second filter 28 is placed in the optical path **16*b* of the reflected light beam from the first filter 26 positioned at a forty-five (45) degree angle of incidence. The second filter 28 is a blue reflecting or forty-five (45) degree long pass separation filter. When placed in the optical path 16***b* of the light beam at a forty-five (45) degree angle of incidence, the second filter 28 transmits greater than ninety (90) percent of the green light with a wave length of about five hundred (500) nanometers or longer via optical path 16*d*, and reflects at least ninety (90) percent of the blue light with a wave length between about 400 and about 500 nanometers via optical path 16*i*.

The color changing device 10 also includes a third filter 30 spaced axially from the first mirror 18 and orthogonally or laterally from the second mirror 22. The third filter 30 is a red and blue transmission and green reflecting filter or red and green and blue combiner plate or filter. The third filter 30 has a first surface 30*a* and a second surface 30*b*. The first surface 30*a* has a broad band anti-reflection coating and the second surface 30*b* is dichroic. When the third filter 30 is placed in the optical path 16*g* of the light beam from the first mirror 18, and the optical path 16*d* from the second mirror 22 at a forty-five (45) degree angle of incidence to the optical paths, the third filter 30 transmits greater than ninety (90) percent of the red and blue (magenta) light of wave lengths between about four hundred (400) and about five hundred (500) nanometers and greater than ninety (90) percent of the light having a wave length between about six hundred (600) and about seven hundred (700) nanometers. It also passes at least about ninety (90) percent of the red light having a wave length between about seven hundred (700) and about eight hundred (800) nanometers. The third filter 30 reflects greater than about ninety (90) percent of the green light having a wave length between about five hundred (500) and about six hundred (600) nanometers and transmits greater than about ninety (90) percent of the red light and blue light having a wave length of from about 600 to 800 nanometers and from about 400 to about 500 nanometers, respectively.

Preferably the filters transmit and reflect 95% of the selected light. With optically efficient mirrors and filters, the color synthesizer is between about 69% and about 81% optically efficient.

The device 10 includes a first aperture 32 disposed axially between the second filter 28 and second mirror 22. The first aperture can be any device that can attenuate the light beam 16*c*. The first aperture 32 is preferably placed perpendicular to the light beam 16*c* transmitted or passing through the second filter 28.

The device 10 includes a second aperture 38 disposed laterally between the second filter 28 and first filter 26. The second aperture 38 is used to attenuate the blue light of light beam 16*i* and is placed in the optical path 16*i* at a normal incidence to the light reflected from the second filter 28.

The device 10 also includes a third aperture 44 disposed between the first mirror 18 and the first filter 26. The third aperture is used to attenuate the light beam 16*a* and is placed in the optical path 16*a* at a normal incidence to the light reflected from the first mirror 18.

Apertures that can be used as apertures 32, 38 and 44 in the present device include iris diaphragms, sliding blade apertures, wedge or step neutral density filters, optical vane shutters, polarizing filters and like mechanical devices that block, reflect or absorb the light in the optical path. The apertures can be manually operated or adjusted by cable linkage, or electrical or hydraulic/pneumatic drivers. For example, the iris diaphragm or vane shutter can be opened or closed with a solenoid or pneumatic piston driver. The polarizing filter or circular wedge neutral density filter can be rotated with an electrical step motor or servo. Electrical driven apertures can be controlled by switches or rheostats and hydraulic driven apertures can be controlled by valves located in control package 33. The electrical power and/or signals and hydraulic power are transmitted via the connectors 34, 40 and 46 to apertures 32, 38 and 44, respectively.

The color changing device 10 can further include a field stop 50 placed in the optical path at a normal incidence to the light beam 16*k* reflected from the third filter 30. The field stop 50 is a plate with an aperture or hole 51 cut in the center; the aperture dimension will be appropriate depending on the light source 12. The field stop 50 acts as a spatial filter to block off diffused light and allow only forwarded directed light to pass from the color changing device. The field stop 50 is spatially fixed relative to the third filter 30. A condenser can be axially spaced from the field stop to collimate or focus the light beam 16*k*.

The device can include an optical array, such as, moving gobos, slide or film holders and lens systems, at the exit end 48 of the device. Such optical array will use the product light beam 16*k* as the light source for the optical array.

For example, the device 10 can additionally include a moving gobo 54 spaced axially from the fixed field stop 50 and condenser 52. Control package 33 can contain a switch connected by control cable 47 to a liquid crystal which creates the moving gobo 54. The moving gobo 54 is a moving pattern/dyed liquid crystal in which sections of the pattern can be switched to clear or translucent by applying an electrical charge. This gives the effect of apertures opening and closing to control a beam of light. By sequencing the control of these apertures with the electrical circuit 33, the appearance of movement can be achieved.

The optical color synthesizer 10 can also include a gobo plate 56 spaced axially from the moving gobo 54. The gobo plate 56 is a round plate attached to a servo motor 58 so as to index one of a plurality, preferably six, apertures (not shown) of the gobo plate 56 in the optical path. Five of the apertures are loaded with aluminum deposited on glass pattern plates (not shown). The sixth position is an open aperture of appropriate diameter. The servo motor 58 can be connected to and controlled by a switch or controller in the control package 33 via control cable 48.

The device 10 can further include a fixed focal length or zoom lens assembly 60. The zoom lens assembly comprises an achromatized set of lenses (not shown), including one biconvex achromatic focus lens, one biconcave achromatic zoom lens and one biconvex output objecting lens. The zoom lens assembly is utilized to project an image of either a section of the gobo plate 56 or the moving gobo 54. It should be appreciated that the fixed focal length and zoom lens assemblies are conventional and well known in the art. It should also be appreciated that the necessary control activity could be made or purchased to perform the above functions.

Other optical arrays can also be employed. Thus, the device is not limited to being used with the optical array 48 just described.

In operation, the light source 12 generates a light beam 16 which is projected to the first filter 26. The first filter 26 transmits a red light beam 16*a* which is reflected off the first surface 20 of the first mirror 18 to the second portion 26*b* of the first filter 26 through the third aperture 44. The cyan (blue-green) reflective light beam 16*b* from the first filter 26 is projected to and separated by the second filter 28. The green light, light beams 16*c* and 16*d*, passes through the second filter 28 and is passed to the second mirror 22 through the first aperture 32. The blue light, light beams 16*i* and 16*j*, is reflected by the second filter 28 at right angle to the first filter 26 through the second aperture 38. The light paths, 16, 6*a*; 16, 16*b*, 16*i*; and 16, 16*b*, 16*c*, from the light source 12 to the third, second and first apertures 32, 38 and 44, respectively, are equidistant. The red beam of light 16*a* exits the third aperture 44 as light beam 16*f*, passes through the first filter 26 and passes through the third filter 30 as light beam 16*g*. The red beam 16*f* combines with reflected blue light from light beam 16*j* at the first filter 26 to form light beam 16*g*. Red-blue light beam 16*g* recombines with reflected green light from light beam 16*d* at the third filter 30 to produce the synthesized color light beam.

The first, second and third apertures 32, 38 and 44 can be the same or different aperture devices. The color hue of the product output light beam 16*k* is controlled by the mix of the intensities of the color light beams 16*d*, 16*j* and 16*f*. If the intensities are equal, the output light beam 16*k* will be the same color as the light source input light beam 16 which will normally be white light, although the light beam can be any visible color light. If the input beam is a single primary color, the device 10 can adjust the intensity of the output light beam but it will not alter the color hue. If the input beam is a complementary color of two primary colors, the device 10 can adjust the color hue between the two primary colors of the input light beam 16. For example, if the input light beam is yellow light of about 800 to about 500 nm, the device can vary the color hue from a red color to a green color and the color hues in between. When the input light beam 16 is white light of from about 800 to about 400 nm, the optical color synthesizer can produce color hues of the three primary colors (red, blue and green), the three complementary colors of the primary colors (magenta, cyan and yellow), and all mixes thereof. This is carried out by attenuating the intensity of one or two of the primary color light beams 16 (green light), 16*i* (blue light) and 16*a* (red light) with the first, second or third apertures 32, 38 or 44, respectively, to obtain light beams 16*d*, 16*j* and 16*f* respectively. An iris diaphragm or vane shutter attenuates the beam by blocking off a portion of the light beam. A neutral density filter attenuates the beam by absorbing a portion of the beam. The apertures do not affect the phase of the light beams and the light beams remain in phase.

The light paths are not focused at the apertures. That is, the optical system incorporating the optical color synthesizer will not have image planes at the apertures. If the color synthesizer is used with the light source 12 and the projection assembly 48, the focal length of the lens assembly 60 is preferably at the light source.

The present invention has been described in an illustrative manner. It is to be understood that the terminology which has been used is intended to be in the nature of words of description rather than of limitation.

Obviously, many modifications or variations of the present invention are possible in the light of the above teachings. Therefore, within the scope of the appended claims, the present invention may be practiced otherwise than as specifically described.

What is claimed is:

1. An optical color synthesizer device for generating a plurality of hues of color from a light source of more than one primary color emitted from a light source, comprising:

a first mirror for reflecting light having a wave length of less than about 800 nanometers from the light source;

a second mirror located between the light source and the first mirror and laterally from said first mirror for reflecting green light;

a first filter having first and second portions, the first portion of said filter disposed between said first mirror and the light source for transmitting red light and reflecting cyan light, the second portion of said filter disposed between said first mirror and a third filter;

a second filter disposed between the first portion of said first filter and said second mirror for transmitting green light from the first portion of said first filter to said second mirror and reflecting blue light from the first portion of said first filter to the second portion of said first filter;

the third filter disposed between said first mirror and said second mirror for transmitting blue light reflected from the second portion of said first filter and red light transmitted through said second portion of said first filter, and for reflecting green light reflected from said second mirror, the light separated at said first and second filters being recombined at said third filter to form an output light beam of a predetermined color hue;

a first mechanical attenuator positioned across and normal to the green light beam transmitted through said second filter for attenuating the green light beam to the second mirror without changing the phase of the light beam;

a second mechanical attenuator positioned across and normal to the blue light beam reflected from the second filter for attenuating the blue light beam to the second portion of the first filter without changing the phase of the light beam; and a third mechanical attenuator positioned across and normal to the red light beam reflected from the first mirror for attenuating the red light beam to the second portion of the first filter without changing the phase of the light beam.

2. The optical color synthesizer device according to claim 1 wherein the optical light paths from the first portion of the first filter to the first, second and third mechanical attenuators are equal distance.

3. The optical color synthesizer device according to claim 2 wherein the optical light paths from the first, second and third mechanical attenuators to the third filter are equal distant.

4. The optical color synthesizer device according to claim 1 wherein at least one of the first, second or third mechanical attenuators is an iris diaphragm positioned coaxially with the light path to be attenuated.

5. The optical color synthesizer device according to claim 1 wherein at least one of the first, second or third mechanical attenuators is an optical louvered shutter that is positioned coaxially with the light path to be attenuated.

6. The optical color synthesizer device according to claim 1 wherein at least one of the first, second or third mechanical attenuators is a neutral density filter.

7. The optical color synthesizer device of claim 6 wherein the neutral density filter is a step neutral density filter.

8. The optical color synthesizer device of claim 6 wherein the neutral density filter is a wedge neutral density filter.

9. The optical color synthesizer device according to claim 1 wherein the mechanical attenuators have an adjustable transmission range of from about 100 percent to about 0 percent.

10. The optical color synthesizer device according to claim 1 including a visible light source.

11. The optical color synthesizer device according to claim 10 wherein the light source is visible light of from about 400 to about 800 nanometers.

12. The optical color synthesizer device according to claim 10 wherein the light source comprises at least two of the primary colors.

13. The optical color synthesizer device according to claim 10 wherein the light source beam is substantially free of infra-red light.

14. The optical color synthesizer device according to claim 1 including a field stop placed in the optical path of the output beam from the third filter at a normal incidence to the output light beam.

15. The optical color synthesizer device according to claim 14 wherein said field stop limits light passing therethrough to forwarded directed light.

16. The optical color synthesizer device according to claim 1 wherein said first mirror comprises a mirror at substantially a 45° angle of incidence placed in the optical path of the red light transmitted through the first portion of the first filter.

17. The optical color synthesizer device according to claim 16 wherein said second mirror comprises a mirror at a substantially 45° degree of incidence placed in the optical path of the green light beam transmitted through the second filter.

18. The optical color synthesizer device according to claim 1 wherein said first filter comprises first portion of a filter placed at a substantially 45° angle of incidence in the optical path of the light beam from the light source and a second portion of the filter placed at a substantially 45° angle of incidence in the optical path of the light beam reflected from the first mirror and from the light beam reflected from the second filter.

19. The optical color synthesizer device according to claim 1 wherein second filter means comprises a filter disposed at a substantially 45° angle of incidence between the first portion of said first filter and said second mirror and is placed in the optical path of the cyan light beam reflected from the first portion of the first filter.

20. The optical color synthesizer device according to claim 1 wherein the third filter means comprises a filter disposed at a substantially 45° angle of incidence between the second mirror and the second portion of the first filter in the optical paths of the green light beam reflected from the second mirror and from the red light beam transmitted through the second portion of the first filter and the blue light beam reflected from the second portion of the first filter.

21. The optical color synthesizer device according to claim 1 wherein the first, second and third mechanical attenuator are driven by electrical devices, independently, to obtain a predetermined attenuation.

22. The optical color synthesizer device according to claim 1 wherein the first, second and third mechanical attenuators are hydraulically/pneumatically driven, independently, to predetermined attenuation.

23. The optical color synthesizer device according to claim 1 wherein the first, second and third mechanical attenuators are driven by cable linkages, independently, to predetermined attenuation.

24. The optical color synthesizer device according to claim 1 wherein the green light transmitted through second filter to said second mirror has a wavelength of from about 500 nanometers to about 600 nanometers;

wherein the blue light reflected from said second filter has a wavelength of from about 400 nanometers to about 500 nanometers; and wherein said red light transmitted through the first portion of said first filter has a wavelength of between about 600 nanometers and about 800 nanometers.

* * * * *